Jan. 8, 1935. A. Y. DODGE 1,987,002
LUBRICATION DEVICE
Filed Feb. 15, 1932 2 Sheets-Sheet 1
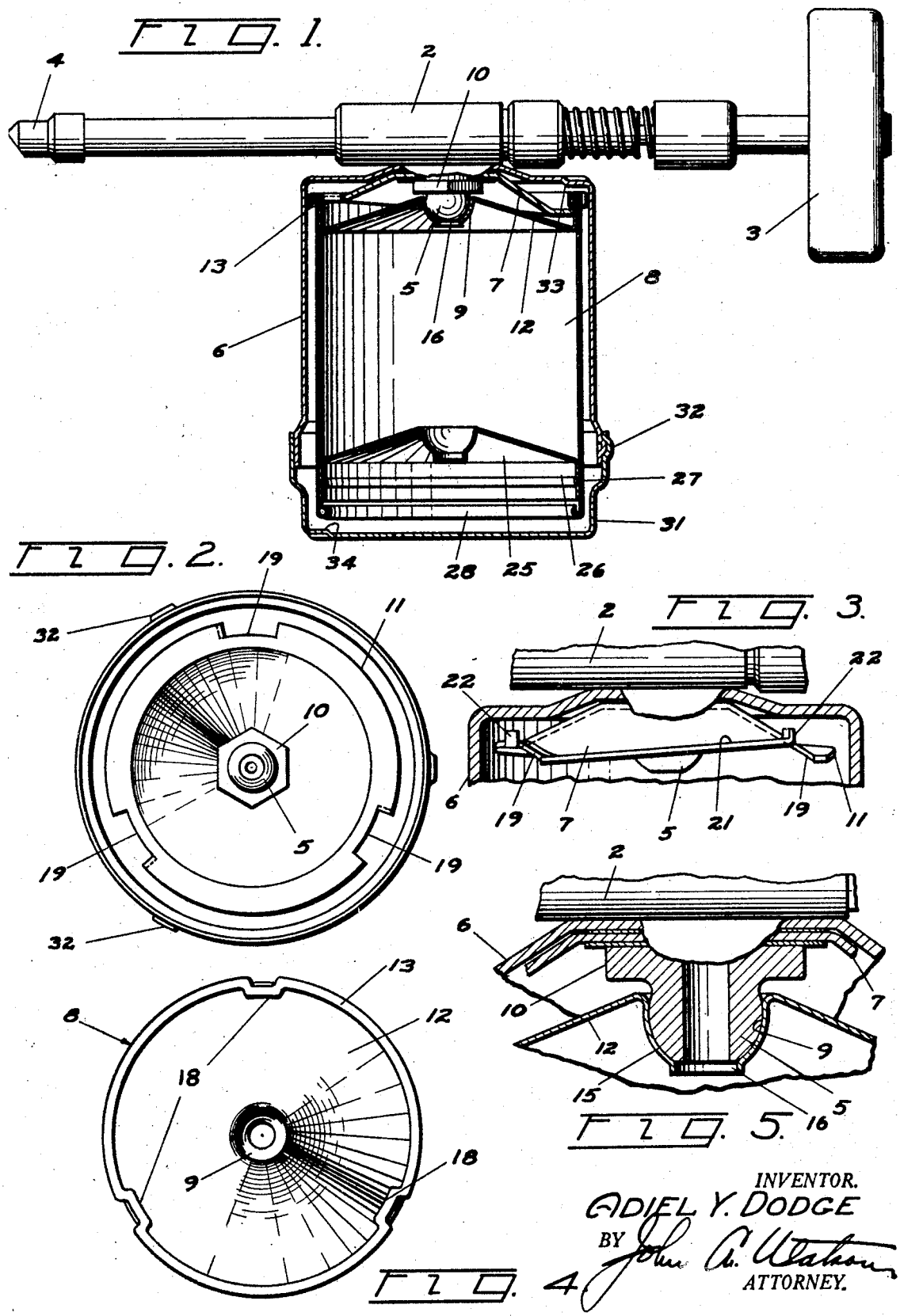

Jan. 8, 1935.  A. Y. DODGE  1,987,002
LUBRICATION DEVICE
Filed Feb. 15, 1932    2 Sheets-Sheet 2
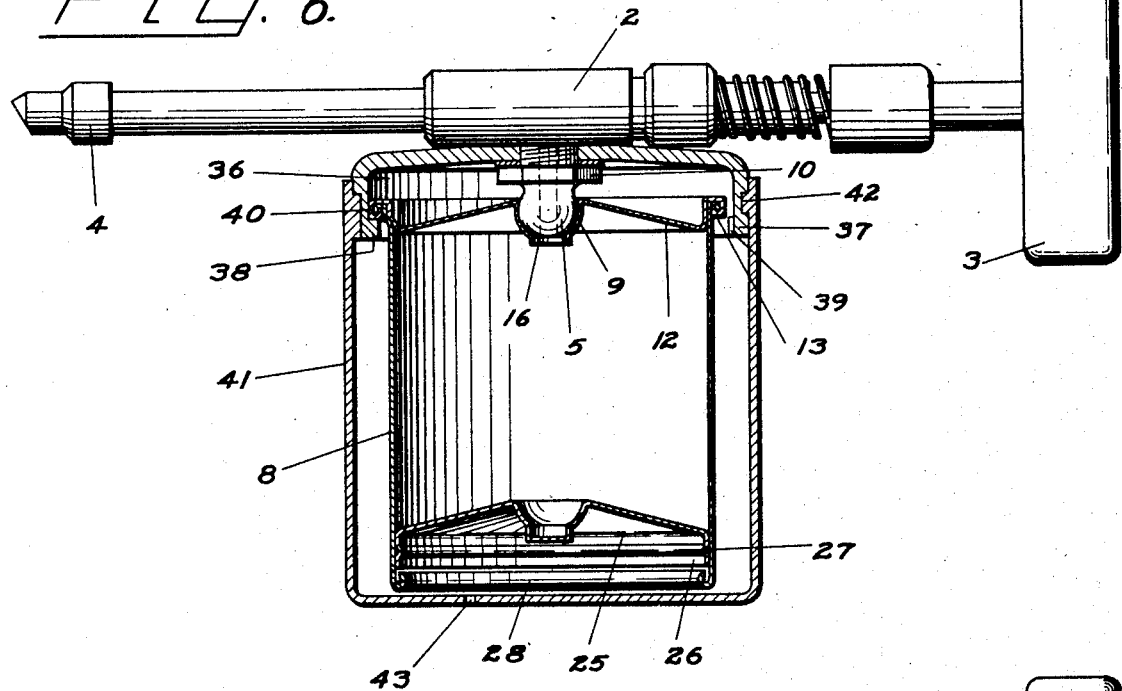
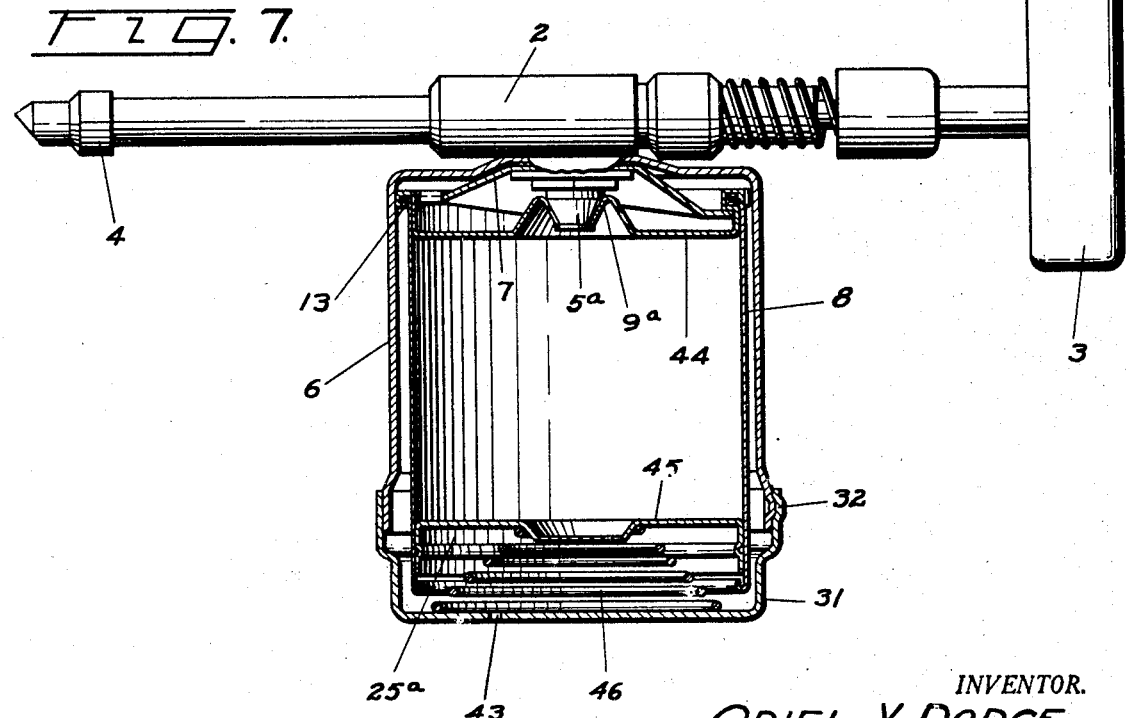
INVENTOR.
ADIEL Y. DODGE
BY John A. Watson
ATTORNEY.

Patented Jan. 8, 1935

1,987,002

UNITED STATES PATENT OFFICE 1,987,002

LUBRICATION DEVICE

Adiel Y. Dodge, South Bend, Ind., assignor to The Lubrication Corporation, South Bend, Ind., a corporation of Delaware Application February 15, 1932, Serial No. 593,007

32 Claims. (Cl. 221—47.4)

This invention relates to improvements in lubrication devices and particularly to lubricant feeding apparatus wherein lubricant is supplied thereto in cartridges.

An object of the invention is to provide a lubrication device wherein means is provided for establishing a universal lubricant tight connection between the cartridge outlet opening and the cartridge connector stud of the feeder apparatus.

Another object of the invention is to provide a lubrication device of the type wherein lubricant is supplied thereto in cartridges, in which means is provided for supporting, and mechanically interconnecting, the cartridge to the feeder or dispenser, by engagement with the cartridge within the confines of its cylindrical side wall, thereby providing a cartridge of maximum capacity within the space allotted for its disposal.

Another object of the invention is to provide a lubrication device of the type wherein a lubricant cartridge is mechanically supported and interconnected with a lubricant feeder apparatus, or dispenser, to act as a source of lubricant supply therefor, and wherein distortion to the relatively light walled cartridge, through substantial, interconnecting stresses, may not occur to interfere with the free movement of the cartridge piston.

Another object is to provide a lubrication device wherein the stresses involved in drawing the cartridge tightly to the connector stud induce a lateral flexing of the side walls of the cooperative cartridge outlet passage causing the walls thereof to engage more closely with the adjacent surfaces of the connector stud.

A further object is to provide a cartridge wherein the piston head and the end wall of the cartridge are so formed as to permit the complete withdrawal of lubricant therefrom.

Other objects, the advantages and the uses of the invention will be or should become apparent after reading the following description and claims and after consideration of the accompanying drawings forming a part of the specification wherein:

Fig. 1 is a side elevation, partly in section, illustrating the features of my invention as embodied in a hand type lubricant gun;

Fig. 2 is a bottom plan view of a part of the structure illustrated in Fig. 1;

Fig. 3 is a side elevation of the parts illustrated in Fig. 2 with the casing in section;

Fig. 4 is a top plan view of the lubricant cartridge;

Fig. 5 is an enlarged fragmentary view of a part of the structure illustrated in Fig. 1;

Fig. 6 is a view similar to Fig. 1 of a modified form of the lubricant gun; and

Fig. 7 is a view similar to Fig. 1 of a further modification of the lubricant gun.

In general the embodiment of the invention illustrated in Fig. 1 comprises a lubricant pressure pump 2 operated by manual actuation of a hand grip 3 and provided with a discharge nozzle 4 adapted to be engaged with a lubricant nipple or fitting associated with the parts to be lubricated. The pump has a cartridge connector stud 5, having a spherical outer side wall, which extends into a cylindrical casing 6 within which means is provided, in the form of a cartridge connector plate 7, for securely holding a lubricant cartridge 8 with its outlet 9 in operative engagement with the spherical wall of the cartridge connector stud 5.

Both the casing 6 and the connector plate 7 are secured to the pump 2 by clamping the parts between a flange 10, on the side wall of the stud 5, and the casing of the pump 2. The shank of the stud is threaded and the flange is hexagonal in form so that a wrench may be used to draw up and tighten the assembly thus formed.

The periphery or cartridge engaging edge 11 of the connector plate 7 extends away from the end wall of the casing 6 and is spaced away from the adjacent side walls of the casing as shown in Fig. 3, so that the side walls of the cartridge may extend into the annular space thus provided.

The cartridge 8 comprises a cylindrical body preferably of sheet metal, one end of which is closed by a convex head plate 12. The head plate is further formed with an outwardly extending side wall at its periphery which is joined at its upper edge with the adjacent edge of the cylindrical body by the formation of a lock seam 13, such as is commonly employed in the construction of fluid tight metal containers. The lubricant outlet 9 is formed in the head plate 12 and its side walls are spherical in contour as shown at 15 and extend inwardly of the head at the center thereof. The inner end of the outlet is formed with a shallow cylindrical wall 16 for the purpose of reinforcing the spherical wall 15, so as to prevent expansion or distortion of the outlet, when subjected to pressure as in interconnecting the cartridge and the feeder.

With reference to Fig. 4 it will be seen that the means for engaging the cartridge 8 with the connector plate 7 comprises a plurality of inwardly extending integral lugs 18 formed in the lock seamed upper end of the cartridge and therefor overhanging the outer surface of the convex face of the head plate 12.

The cartridge connector plate 7 has a plurality of recesses 19 in its outer edge 11 for permitting the lugs 18 of the cartridge to pass above the connector plate, so as to bear against the upper surface of the plate when the cartridge is rotated. In the present embodiment I have shown three lugs 18 and three recesses 19, so that a three point support may be had to equally distribute stresses, although obviously the number of these elements employed may be altered to suit requirements.

Means for causing the cartridge to be drawn toward the cartridge connector stud 5 as it is rotated after engagement with the connector plate 7, as described, is provided for by inclining the regions 21 of the connector plate, between the recesses 19 along its periphery, with respect to that plane within which the recesses 19 are located. A portion of the material sheared away in forming the recesses 19 is turned upwardly at the upper end of the inclined surfaces 21 to form positive stops 22 for the lugs 18, should they be capable of traversing the entire edge between adjacent recesses, though such extensive movement is not likely to occur because of the resistance offered as the cartridge engages with the connector stud 5.

In providing the lugs 18 on the inner walls of the cartridge; and the connector plate 7 for introduction within that space defined by the cartridge side walls I have eliminated all possibility of the inward distortion of the cartridge walls, which if present, would seriously impair the free movement of a piston within the cartridge, particularly as it approached the head 12. It is therefore possible, if desired, to construct the cartridge 8 with relatively thin walls thus effecting a saving in the cost of the cartridge. Further, the disposition of the lugs 18 within that space defined by the outer walls of the cartridge permits the use of a cartridge of relatively large capacity as compared to the size of the casing 6, and but a relatively small space need be provided between the adjacent walls of the cartridge and casing.

The formation of the lugs 18 in the lock seam 13 aside from providing relative rigidity in that portion of the cartridge in which the lugs are located serves to transmit, directly, the thrust caused by the movement of the lugs along the inclined surfaces 21 to the head 12 of the cartridge so that the outlet opening 9 thereof may be held in engagement tightly with the conical surface of the cartridge connector stud 5.

The spherical outer surface of the stud 5 is designed to exactly conform with the spherical wall 15 of the cartridge outlet opening, as is shown in Fig. 5, and the center about which the surface is generated lies substantially below the flanged portion 10, so that a universal connection by surface contact is established between the stud and the cartridge outlet opening. This is an important feature of the invention since the effectiveness of the lubricant tight seal between the relatively large contacting surfaces of the stud and the outlet is not impaired by improper angular alignment of the cartridge and connector plate 7.

Another and important advantage attained by the structure herein described is that the convex wall of the head 12, when pressure is brought to bear thereupon, as when the cartridge is drawn toward the stud 5, causes the spherical wall 15 of the outlet to wrap more closely about the spherical outer wall of the stud and remain so as long as the parts are thus assembled.

An additional advantage attained by the use of the conical surfaced stud 5 is that while it is initially intended to be used with a cartridge having a spherical walled outlet opening it may be used successfully with a cartridge having an outlet opening formed with a conical wall or merely a round opening of lesser diameter than the diameter of the spherical portion of the stud.

A follower piston 25, having a rearwardly extending skirt 26 provided with a packing ring 27, is slidably disposed in the cartridge to close the lower end of the cartridge so that it may follow the lubricant under atmospheric pressure as it is drawn upwardly through the stud 5 into the pressure pump 2. Means for retaining the piston within the cartridge body is provided for in a bead 28 rolled in the lower edge of the body on the inner side. The bead also serves to reinforce the lower and open end of the cartridge. In order that all of the lubricant may be withdrawn from the cartridge the inner face of the piston is designed to exactly conform with the inner contour of the head 12.

A cap 31 is provided for the lower end of the casing 6 and secured thereto by bayonet locks 32 of conventional construction so as to entirely house the cartridge during use.

The end wall of both the casing 6 and the cap 31 are formed with inwardly extending radially disposed bosses adjacent to their outer edges as indicated at 33 and 34 respectively, so that the user may not, through a lack of understanding, risk the use of an inferior type of lubricant such as may be purchased of irresponsible vendors in plain cylindrical containers, which might otherwise be placed within the casing with the open end contacting the inner wall of the casing to form a seal.

It is contemplated, however, that the user of the gun shall not be prohibited from the use of bulk lubricant of his own choice, in which case, the cartridge is dispensed with and the casing filled with the lubricant, after which, a follower piston of any satisfactory design such as shown herein may be used to follow the lubricant in the casing as it is withdrawn.

In Fig. 6 I have illustrated a modified form of the lubricant gun similar in many respects to the lubricant gun illustrated in Fig. 1, and like reference numerals have been used to designate like parts. The gun in Fig. 6 differs, however, in that the cartridge connector plate 7 is replaced by a connector plate 36 having a downwardly extending skirt 37 provided with an internally extended shoulder 38 at its lower end having recesses 39, for engaging with outwardly extending lugs 40 formed in the lock seam 13 of the cartridge 8. The skirt 37 of the connector plate 36 is also adapted to support a casing 41 by a bayonet lock structure of the conventional type as indicated at 42 so that the casing may be removed for handling and replacing the cartridge. A vent opening 43 is provided in the end wall of the casing 41 so that the casing will not interfere with the function of the piston 25 by atmospheric pressure.

In this modification of the lubricant gun I have reduced the number of parts by eliminating the cap 31 and obviously the gun may be constructed at a lower cost. It is also possible to employ the gun without the casing 41 in place, thus materially reducing the weight of the assembly and therefore obtaining greater ease in hand manipulation.

In Fig. 7 I have illustrated a lubricant gun which differs from that gun illustrated in Fig. 1 in that the cartridge connector stud 5 is replaced by a cartridge connector stud 5a having a conical outer side wall as distinguished from the spherical outer wall of the stud first described. The cartridge outlet opening in the head 44 of the cartridge 8 is defined by a conical wall 9a adapted to cooperate with the conical wall of the connector stud to form, by wedge like action, a lubricant tight connection between the parts, maintained by the cooperation of the lugs 18 of the cartridge and the inclined surfaces 21 of the cartridge connector plate 7 as described.

A piston 25a having a head 45, generally conforming in contour to the inner surface of the head 44 of the cartridge, is slidably disposed within the cartridge and may be urged inwardly by a compression spring 46. When the spring 46 is used the piston functions as a pressure piston to maintain the lubricant in the cartridge under slight pressure. If the spring is not employed the piston becomes a follower piston as previously shown in Figs. 1 and 6.

The lubricant gun of Fig. 7 functions similar to the gun illustrated in Fig. 1 except that a universal connection is not established between the cartridge outlet 9a and the stud 5a other than that provided for in the flexing of the relatively light material of the head 44 of the cartridge. The effectiveness of the lubricant tight seal between the cartridge outlet and the stud is however dependent upon the thrust applied by cooperation of the lugs 18 of the cartridge and the cartridge connector plate 7 as in the case of the form first described.

It is to be understood that the above described embodiments of the invention are for the purpose of illustration only, and various changes may be made therein without departing from the spirit and scope of the invention.

I claim:

1. A lubricant cartridge having a convex sheet metal head provided with an outlet orifice defined by a spherical wall extending inwardly of the central portion of the convex surface of the head, said outlet being further formed with a cylindrical wall of appreciable length adjacent, and beyond, the innermost end of the spherical wall.

2. A lubricant cartridge comprising a cylindrical body, an inset sheet metal head having a convex end wall and closing one end of said body, said head having an outlet opening therethrough defined by an inwardly extending spherical wall located centrally of the convex surface and terminating in cylindrical wall of an appreciable but shallow length.

3. In a lubrication device, wherein lubricant is conducted from a cartridge to a lubricant feeder, a cartridge connector stud having a lubricant passage therethrough and having a flange extending outward radially of the axis thereof, and a spherical head at one end beyond the flange, the center about which said spherical wall is generated, lying axially beyond the plane of said flange.

4. A lubricant cartridge comprising a sheet metal cylinder having a closure member in one end, a piston slidably mounted within the cylinder, said piston being provided with a rearwardly extending skirt, said closure member being inset inwardly of the cylinder to form an annular space within which a lubricant gun connection member may be received, and a plurality of lugs on said cylinder, said lugs projecting over said closure member.

5. In a lubrication device, wherein lubricant is conducted from a cartridge to a lubricant feeder, a cartridge connector stud having a flange extending radially therefrom and a spherical outer wall beyond the flange, the center about which said spherical wall is generated lying beyond the plane of said flange, said spherical wall terminating at the outer end of the stud in a flat end wall perpendicular to the longitudinal axis thereof.

6. A lubricant cartridge comprising a cylinder having an inset, convex, head provided with an inwardly extending outlet orifice centrally located therein, a piston in said cylinder having a rearwardly extending skirt and provided with a head formed closely to follow the contour of the inner surfaces of said cartridge head and said inwardly extending outlet and a plurality of lugs on one end of said cylinder, said lugs projecting inwardly of the cylinder wall.

7. In combination, a lubricant feeder device having a cartridge connector stud having a spherical side wall and a lubricant receiving orifice therein, a lubricant cartridge having an outlet orifice defined by a spherical inner wall, adapted to contact with the spherical wall of said stud to form a universal connection therewith, and means including interlocking devices on the feeder and cartridge for mechanically interconnecting said cartridge with said feeder device with their said orifices aligned.

8. In combination, a lubricant feeder device having a cartridge connector stud having a spherical side wall and a lubricant receiving orifice therein, a lubricant cartridge having an outlet orifice, the last said orifice being defined by a spherical inner wall adapted to contact with the spherical wall of said stud to form a universal connection therewith, and means including interlocking devices on the feeder and cartridge for mechanically interconnecting said cartridge with said feeder device with their said orifices aligned and for simultaneously drawing the cartridge and feeder toward one another.

9. In combination, a lubricant feeder apparatus having an inlet passage, a lubricant cartridge for supplying lubricant to said feeder apparatus, having a head provided with an outlet opening, means for establishing a universal connection between said feeder inlet passage and said cartridge outlet opening, and bayonet locking means for mechanically connecting said cartridge to said feeder apparatus.

10. In combination, a lubricant feeder apparatus having an inlet passage, a lubricant cartridge for supplying lubricant to said feeder apparatus, having a head provided with an outlet opening, means for establishing a universal connection between said feeder inlet passage and said cartridge outlet opening, and bayonet locking means for mechanically connecting said cartridge to said feeder apparatus and for drawing said cartridge toward said feeder apparatus.

11. In combination a lubricant feeder apparatus having a cartridge connector stud, said stud being formed with a spherical outer wall, including a feeder inlet passage, a lubricant cartridge for supplying lubricant to said feeder apparatus, having an inset head provided with a convex end wall, said head having an outlet opening therethrough, defined by a spherical side wall and disposed centrally of said convex end wall and adapted to cooperate with said cartridge connector stud to form a lubricant tight seal, and cam means operative upon relative rotational movement between said cartridge and said feeder apparatus for pressing said cartridge outlet tightly into engagement with said cartridge connecting stud.

12. In a lubrication device, a casing, a cartridge connector stud extending through the end wall of the casing, and a cartridge connector plate mounted within the casing and spaced away at its periphery from the inner surface of said end wall for engaging with and supporting a lubricant cartridge, the end wall of said casing having portions of its inner surface lying in more than one plane.

13. In a lubrication device, a cylindrical casing having one end closed, a cartridge connector stud extending through the central portion of one end wall of said casing and a cartridge connector plate, concentric with said stud, and rigidly mounted within said casing at a predetermined distance from the inner surface of said casing end wall, said connector plate having its periphery extending toward and concentric with the inner side wall of said casing, whereby a relatively narrow annular space is formed therebetween, said casing having the inner surface of said end wall lying in more than one plane.

14. A lubricant cartridge having an inset head provided with an outlet opening therethrough and inwardly extending lugs formed on the inner side walls thereof, above the head portion.

15. A lubricant cartridge comprising a cylindrical body having a head forming a closure for one end thereof and a plurality of lugs formed on said cartridge extending inwardly over the head and toward the center thereof.

16. In a lubrication device, a lubricant feeder apparatus including a cartridge connector plate, said connector plate having its edges extended away from said apparatus and provided with recesses therein.

17. In a lubrication device, a lubricant feeder apparatus including a cartridge connector plate, said connector plate having its edges extended away from said apparatus and provided with recesses therein and further formed with inclined portions between said recesses.

18. In a lubrication device, a lubricant feeder apparatus including a cartridge connector plate and a lubricant cartridge for supplying lubricant to said lubricant feeder apparatus, said cartridge having an end closure member and having inwardly directed lugs on one end thereof beyond said member for engagement with said connector plate to support said cartridge thereupon.

19. In a lubrication device, a lubricant feeder apparatus including a cartridge connector plate, a lubricant cartridge having a cylindrical body and a head forming a closure for one end, said head and body defining a circumferential recess, and cooperative means on said cartridge and plate for interlocking the cartridge and plate with the rim of said plate within said recess.

20. In a lubrication device, a lubricant feeder gun, a casing secured to the gun, said gun having a lubricant inlet located within said casing, and a cartridge connector plate mounted on the gun and disposed within said casing, said plate extending laterally to within a relatively short distance of the inner side walls of the casing.

21. In a lubrication device, a casing, a cartridge connector stud extending through the end wall of the casing, and a cartridge connector plate mounted within the casing and spaced away at its periphery from the inner surface of said end wall, for engaging with, and supporting a lubricant cartridge within said casing.

22. In a lubrication device, a cylindrical casing having one end closed, a cartridge connector stud extending through the central portion of said closed casing end, and a cartridge connector plate concentric with said stud and rigidly mounted within said casing at a predetermined distance from the inner surface of said closed end, said connector plate having its periphery extending toward, and concentric with, the inner side wall of the casing, whereby a relatively narrow annular space is formed therebetween.

23. In a lubrication device, a casing, a cartridge connector stud extending through the end wall of the casing, and a cartridge connector plate mounted within the casing, and spaced away at its periphery from the inner surface of said end wall, for engaging with and supporting a lubricant cartridge within said casing, the periphery of said connector plate being formed to provide, recessed, bayonet lug engaging portions.

24. In a lubrication device, a lubricant feeder gun having a lubricant inlet opening, a casing surrounding said inlet, a cylindrical lubricant cartridge, having an outlet opening adapted to be interconnected with said feeder gun inlet opening and a cartridge connector plate for engaging with, and supporting, said cartridge within said casing, said connector plate being separated from the adjacent end and side walls of said casing and being of lesser diameter than said cartridge.

25. In a lubrication device, a cylindrical casing having one end closed, a cartridge connector stud extending through the central portion of said casing end, a cartridge connector plate concentric with said stud and rigidly mounted within said casing, at a predetermined distance from the inner surface of said closed casing end, said connector plate having its periphery extending toward, and concentric with, the inner side wall of the casing whereby a relatively narrow annular space is formed therebetween, and a cap for the remote end of said casing.

26. In a lubrication device, a lubricant feeder apparatus including a cartridge connector plate, a lubricant cartridge comprising a cylindrical body having an inset head, said connector plate being formed to support said cartridge, by engagement with the inner side walls thereof, in that portion forward of said inset head.

27. In a lubrication device, a lubricant feeder apparatus including a dished cartridge connector plate having its edges extending away from said apparatus, and formed with recesses in the periphery thereof, and a cartridge comprising a cylindrical body, formed with inwardly extending lugs adapted to pass through the recesses in said plate, and to bear upon the remote side of said plate when the cartridge is rotated relative thereto.

28. In a lubrication device, a lubricant feeder apparatus including a dished cartridge connector plate having its edges extending away from said apparatus, and formed with recesses in the periphery thereof, and having those regions between said recesses inclined and a cartridge comprising a cylindrical body formed with inwardly extending lugs adapted to pass through the recesses in said plate, and to bear upon the remote side of said plate when the cartridge is rotated relative thereto.

29. In a lubrication device, a lubricant feeder apparatus comprising a lubricant pump, a cartridge connector stud having a conical side wall, a cartridge connector plate associated with the pump, a lubricant cartridge having a cylindrical body and a head provided with an outlet opening formed with conical side walls and having inwardly extending lugs adjacent to said head for engagement with said connector plate to interconnect the cartridge and pump with the cartridge outlet opening and connector stud operatively engaged.

30. A lubricant cartridge comprising, a substantially cylindrical body, an inset flexible sheet metal head having an outwardly directed central portion with an outlet opening substantially central thereof, and an inwardly extending spherically concave wall surrounding and defining said outlet opening.

31. A lubricant cartridge comprising, a sheet metal cylinder, a closure member for one end of said cylinder, said closure member being inset inwardly of the end of said cylinder to provide an annular space within which a lubricant gun connection member may be received and secured, and means on said end of said cylinder and projecting over said annular space and over said closure member for cooperatively engaging and securing a complementary means on a lubricant gun connection member.

32. In combination, a lubricant dispensing apparatus including a connection member for sealing engagement with a lubricant containing cartridge, said member having an outer wall portion of spherical contour, said member also having a lubricant conducting passageway therethrough and terminating at one end at said surface, and a cartridge secured to said apparatus, said cartridge comprising, a substantially cylindrical body, an inset flexible sheet metal head having an outwardly directed central portion with an outlet opening substantially central thereof, an inwardly extending spherically concave wall surrounding said opening, and means for urging said connection member tightly against said concave wall whereby to effect a lubricant tight seal therebetween.

ADIEL Y. DODGE.